G. BRAVI.
SPRINGLESS OR FLOATING SUSPENSION FOR VEHICLES.
APPLICATION FILED MAY 2, 1917.

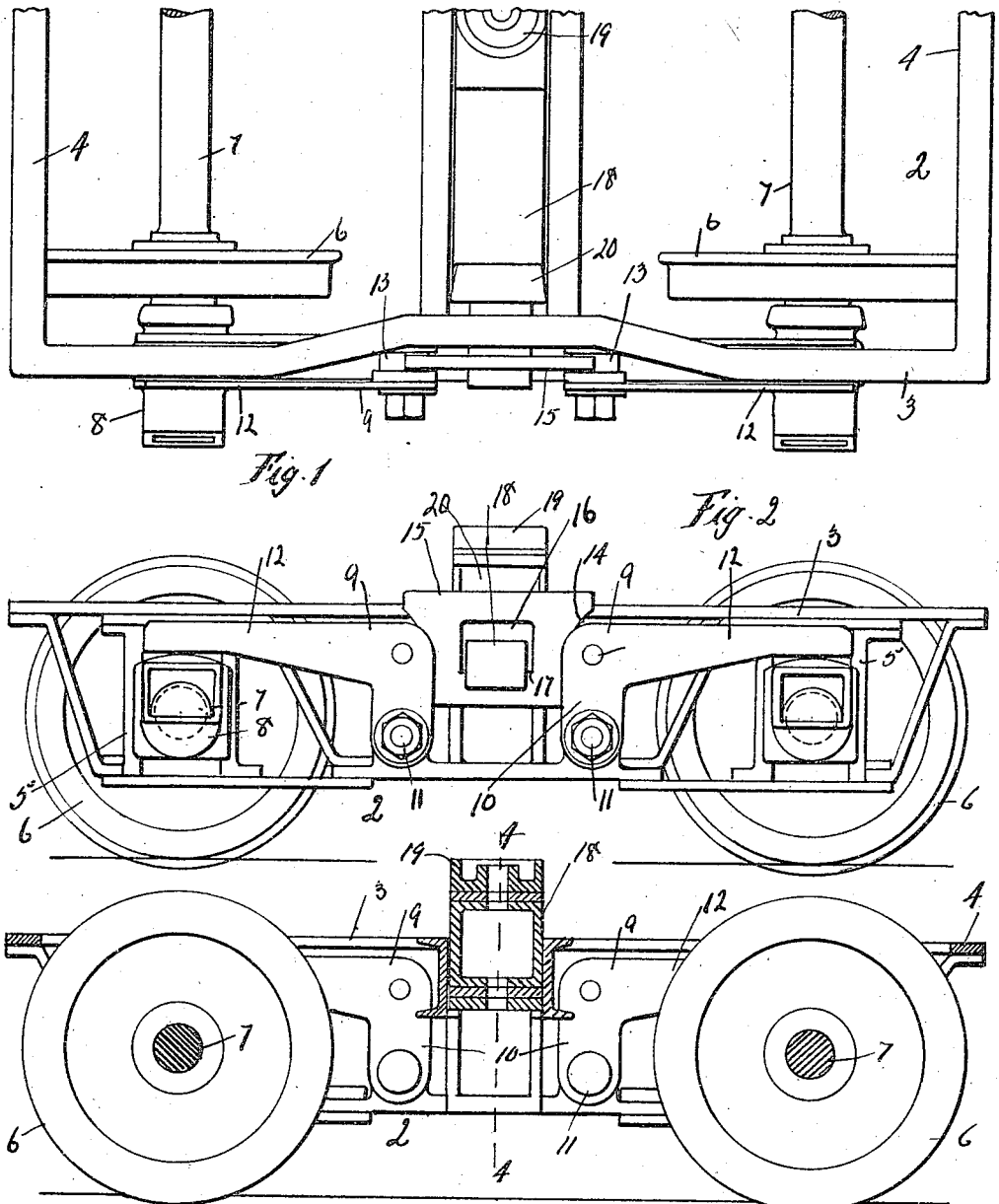

1,259,351.

Patented Mar. 12, 1918.
3 SHEETS—SHEET 2.

INVENTOR
Giuseppe Bravi
BY
W. W. Williamson
ATTORNEY

G. BRAVI.
SPRINGLESS OR FLOATING SUSPENSION FOR VEHICLES.
APPLICATION FILED MAY 2, 1917.

1,259,351.

Patented Mar. 12, 1918.
3 SHEETS—SHEET 3.

INVENTOR
Giuseppe Bravi
By W. W. Williamson
Atty.

UNITED STATES PATENT OFFICE.

GIUSEPPE BRAVI, OF NORRISTOWN, PENNSYLVANIA, ASSIGNOR OF ONE-HALF TO SANTE T. ALLEVA, OF NORRISTOWN, PENNSYLVANIA.

SPRINGLESS OR FLOATING SUSPENSION FOR VEHICLES.

1,259,351.	Specification of Letters Patent.	Patented Mar. 12, 1918.

Application filed May 2, 1917. Serial No. 165,881.

*To all whom it may concern:*

Be it known that I, GIUSEPPE BRAVI, a subject of the King of Italy, residing at Norristown, in the county of Montgomery and State of Pennsylvania, have invented new and useful Improvements in Springless or Floating Suspensions for Vehicles, of which the following is a specification.

My invention relates to new and useful improvements in springless or floating suspension for vehicles, and has for its object to provide equalizing means other than springs for supporting the load and taking up the shock between the wheels and vehicle body incident to the vehicle traveling over uneven rails or road bed.

Another object of the invention is to provide a vehicle suspension in which the body will be maintained in the same plane, regardless of the vertical movement of the wheels.

A further object of the invention is to provide a vehicle frame or truck with slidable wheel sets having coacting equalizing levers acting upon cam plates which support the bolster or vehicle body.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which—

Figure 1, is a fragmentary plan view of a vehicle frame or truck showing my invention applied thereto.

Fig. 2, is a side elevation thereof.

Fig. 3, is a vertical and longitudinal section thereof.

Figure 4:
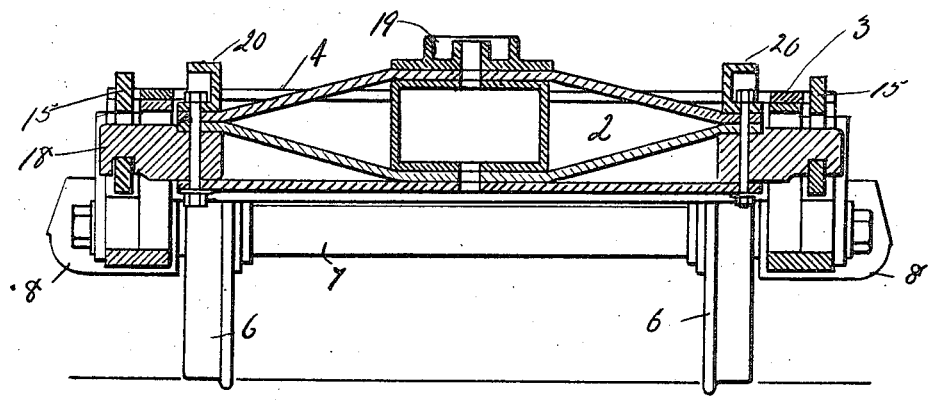
Fig. 4, is the section on the line 4—4 of Fig. 3.

In carrying out my invention as herein embodied, 2 represents a vehicle or truck frame of any ordinary and well known construction here shown as the standard or ordinary railway car truck, and consists of the side pieces 3, end pieces 4, and the pedestals 5.

The vehicle or truck frame is supported on suitable wheels 6, mounted upon the axles 7 which are journaled in the journal boxes 8, the latter being slidably mounted in the pedestals, the same as in an ordinary construction of railway car trucks.

The pair of equalizing levers 9 coacts with each wheel set, and as here shown, there is one lever for each end of each axle, or for each of the journal boxes. These equalizing levers 9 are pivoted to the side pieces 3 at the outer or lower ends of the shorter arms 10 of said levers as at 11, while the longer arms 12 engage the upper or top portions of the journal boxes or other suitable part of the wheel sets.

The equalizing members 9 are virtually L-shaped and are pivoted to the side piece of the truck frame between the wheel sets with the longer arms projecting outwardly toward said wheel sets, and the pair of levers of one side of the vehicle frame or truck coact with different wheel sets as plainly shown in Fig. 2.

Each equalizing lever carries a roller 13, preferably journaled at the elbow, and the rollers on the equalizing levers situated on the same side of the truck frame coact with the oppositely disposed concave arcuate cam surfaces 14 of the cam plate 15. The cam surfaces 14 are of sufficient length, so as to project under the rollers a sufficient distance to prevent the upward accidental withdrawal of the cam plates while in use.

Each of the cam plates is provided with a central opening 16, the lower wall of which is convex as at 17, and on these convex surfaces rest the ends of the bolster 18, said bolster being provided with the ordinary king plate 19 and the truck side bearings 20.

Figure 6:
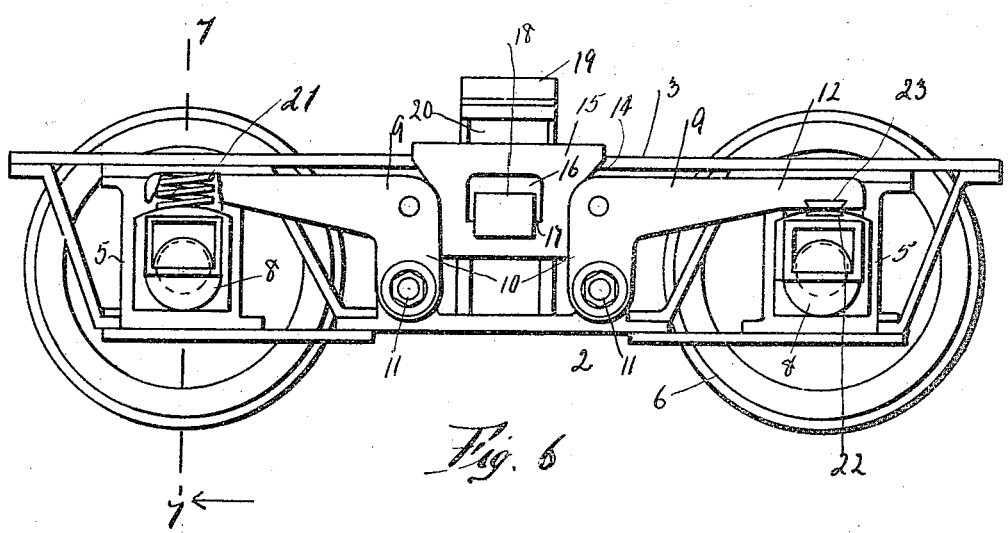
Fig. 6, is a side elevation of the vehicle frame or truck having my invention applied thereto, and showing a portion broken away to clearly illustrate additional constructions.

In Fig. 6, I have shown the use of springs 21 between the vehicle or truck frame, and the wheel sets which act as buffers between the frame and wheel sets but do not support the load have any effect whatsoever on the operation or the practice of my invention, except to prevent the metallic parts from hammering open one another.

Figure 7:
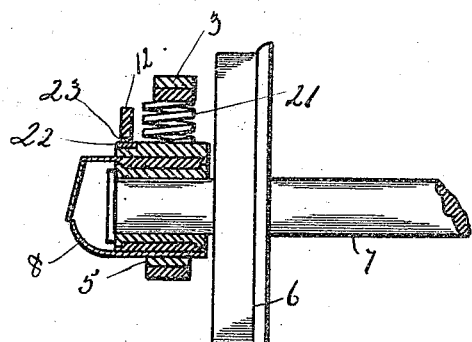
Fig. 7, is a fragmentary section at the line 7—7 of Fig. 6.

As two pieces of metal working upon each other often quickly wear out, it may be advisable to interpose a material of a different kind between the parts, and to illustrate this, I have shown in Figs. 6 and 7 a suitable resilient material embedded in the journal boxes and other pieces of such material embedded in the coacting ends or longer arms of the equalizing levers, said pieces or sections of material being represented by the reference numerals 22 and 23 respectively.

Although I have shown this material embodied in both the coacting elements or members, it may be found in actual practice that this is unnecessary, so that the metallic body of one member may engage such a piece of material embodied in another member.

From the foregoing description, it will be seen that when the truck is traveling along a track or road bed, and the forward wheels come in contact with an obstruction over which they ride, the forward wheel set will be lifted, so that the journal boxes will slide upward in their pedestals, and this lifting of the forward wheel set, will raise the outer ends of the longer arms of the forward equalizing levers, therefore, moving the forward equalizing levers about their pivoted points, causing a variance of the angles between the forward and rear equalizing levers so that the movements of the forward pair of equalizing levers will be transmitted through the cam plates to the rear equalizing pairs, and thence to the rear wheel set, causing the rear end of the truck or vehicle frame to be elevated in the same proportion as the forward wheel set is elevated or in the same proportion as the forward end of the truck frame is lowered with relation to the forward wheel set thereby maintaining the load upon the bolster in substantially the same plane. This action will cause the shock incident to the forward wheels riding over an obstruction to be absorbed or so distributed by the parts as to prevent its transmission to the vehicle body.

As the ends of the bolster rest upon a convex surface 17, there is but a relatively small surface of the bolster in contact with the cam plate thereby preventing any vertical oscillation of the cam plate from being transmitted to the bolster to cause said bolster to be moved transversely.

Figure 5:
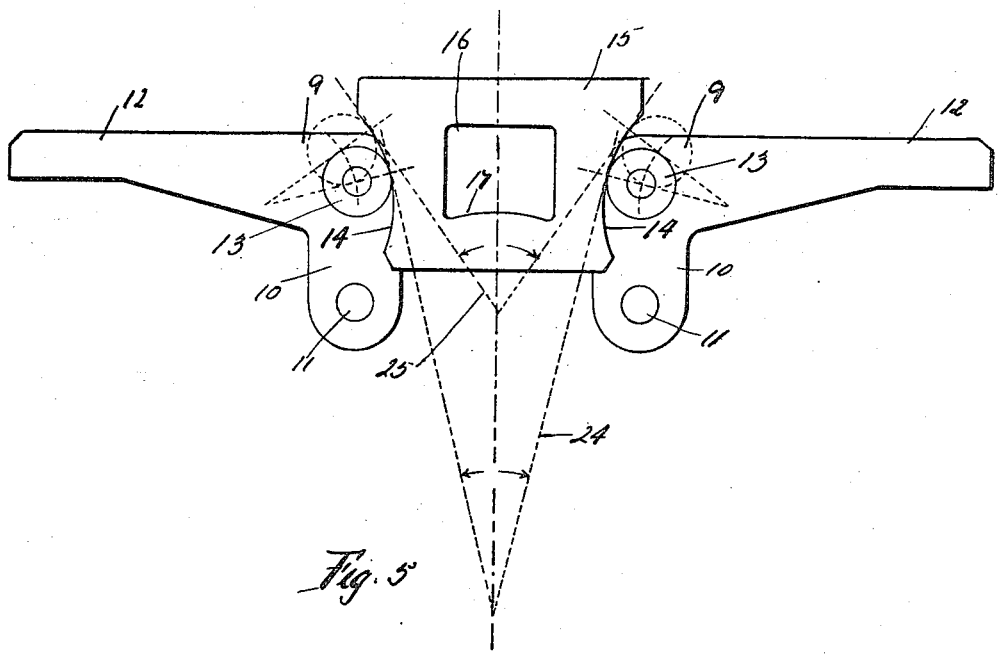
Fig. 5, is an enlarged face view of the equalizing levers and the coacting cam plate illustrating different positions of the roller on the cam plate incident to heavy and light loads.

By taking special note of Fig. 5, it will be obvious as the positions of the equalizing levers are changed, the angles of resistance of the rollers upon the cam surfaces of the cam plate will be changed, as for instance, when the load upon the bolster is relatively light, the parts will be in the positions represented in full lines, and the angle of resistance will be represented by the dotted lines 24, while when the load upon the bolster is heavier, the relative position of the rollers upon the cam surfaces will be different, such as that where the rollers are represented in dotted lines at which time, the resistance between said rollers and the cam surface will be increased, and the angles of such resistance will be as indicated by the dotted lines 25.

Of course, I do not wish to be limited to the exact details of construction as here shown, as these may be varied within the limits of the appended claims without departing from the spirit of my invention.

Having thus fully described my invention, what I claim as new and patentable is—

1. A springless or floating suspension comprising a frame, wheel sets, vertically slidable in said frame, a pair of equalizing levers located on each side of the frame, each coacting with one of the wheel sets, and a load bearing cam plate located between each pair of equalizing levers for the purpose stated.

2. In a device of the character stated, a frame, wheel sets each comprising a pair of wheels, an axle, and journal boxes for the ends of said axles, virtually L shaped, equalizing levers pivoted at the outer ends of the shorter arms to the sides of the frame with the longer arms projecting outwardly and coacting with the journal boxes, rollers, carried by the equalizing levers and located at their elbows, and a cam plate provided with concave arcuate cam surfaces coacting with the rollers whereby motion is transmitted from one equalizing lever to the other, and means supported by the cam plates for supporting a vehicle body.

3. In a device of the character stated, a frame, journal boxes slidable in said frame, a pair of equalizing levers pivoted on each side of the frame by means of the shorter arms and within the spaces between the journal boxes, the longer arms of said levers projecting outwardly and coacting with the journal boxes, and cam plates having a concave arcuate surface coacting with each pair of equalizing levers on the same side of the frame whereby said levers will be actuated in unison, said cam plates also having an opening therein, the edge of the metal below said opening being convex, and a bolster, the ends of which rest upon the convex surface of the cam plates for the purpose specified.

4. A springless or floating suspension for vehicles comprising a frame, wheel sets vertically slidable in said frame, springs located in said wheel spaces, and the frame equalizing levers, pivoted to the sides of the frame and coacting with the wheel sets, and a cam plate coacting with adjacent pairs of equalizing levers on the same side of the frame, said cam plate adapted to support the load.

5. A suspension for vehicles comprising a frame, journal boxes slidable in said frame, a section of material different from that of the journal boxes, embedded in each journal box a pair of equalizing levers pivoted to each side of the frame, sections of material embedded in said levers and arranged to coact with the embedded material in the journal boxes and a load supporting cam plate coacting with each pair of adjacent equalizing levers.

In testimony whereof, I have hereunto affixed my signature.

GIUSEPPE BRAVI.

Copies of this patent may be obtained for five cents each, by addressing the "Commissioner of Patents, Washington, D. C."